US010331756B2

(12) United States Patent
Chen et al.

(10) Patent No.: US 10,331,756 B2
(45) Date of Patent: Jun. 25, 2019

(54) ACCESSIBILITY TAGGER FOR NON-ACCESSIBILITY ENABLED WEBPAGES

(71) Applicant: INTERNATIONAL BUSINESS MACHINES CORPORATION, Armonk, NY (US)

(72) Inventors: Hsiao-Yung Chen, New Taipei (TW); Chao Yuan Huang, Taipei (TW); Hung-Jung Lai, Taipei (TW); Yin Qian, Shanghai (CN); Fei Shen, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 250 days.

(21) Appl. No.: 15/193,880

(22) Filed: Jun. 27, 2016

(65) Prior Publication Data
US 2017/0371975 A1    Dec. 28, 2017

(51) Int. Cl.
*G06F 17/30* (2006.01)
*G06F 16/957* (2019.01)
*G06F 17/21* (2006.01)
*G06F 16/958* (2019.01)
*G06F 17/22* (2006.01)

(52) U.S. Cl.
CPC ........ *G06F 16/9574* (2019.01); *G06F 16/986* (2019.01); *G06F 17/218* (2013.01); *G06F 17/227* (2013.01); *G06F 17/2247* (2013.01)

(58) Field of Classification Search
CPC .... G06F 17/30; G06F 17/00; G06F 17/30902; G06F 17/30598; G06F 16/986; G06F 16/9574

USPC .................................................. 707/600–899
See application file for complete search history.

(56) References Cited

U.S. PATENT DOCUMENTS

| | | | |
|---|---|---|---|
| 6,192,382 B1 | 2/2001 | Lafer et al. | |
| 6,901,585 B2 | 5/2005 | Dutta et al. | |
| 7,010,581 B2 | 3/2006 | Brown et al. | |
| 7,769,767 B2 * | 8/2010 | Petersen | G06F 17/30867 707/754 |
| 2007/0130510 A1 | 6/2007 | Dharamshi et al. | |
| 2010/0205523 A1 | 8/2010 | Lehota et al. | |
| 2014/0180846 A1 | 6/2014 | Meron | |

FOREIGN PATENT DOCUMENTS

WO    2014/169775    10/2014

OTHER PUBLICATIONS https://developer.mozilla.org/en-US/docs/Web/Accessibility-ARIA accessed Apr. 12, 2016.
Yakup Akgül, Web Accessibility Evaluation of Government Websites for People with Disabilities in Turkey, Journal of Advanced Management Science vol. 4, No. 3, May 2016.

* cited by examiner

*Primary Examiner* — Isaac M Woo
(74) *Attorney, Agent, or Firm* — Tutunjian & Bitetto, P.C.; Scott Dobson

(57) ABSTRACT

Methods and systems for improving content accessibility include retrieving an accessibility tag for a piece of content. The piece of content is modified with the accessibility tag to enable one or more accessibility features for the piece of content. The piece of content is then rendered with the accessibility features.

20 Claims, 7 Drawing Sheets

ACCESSIBILITY TAGGER FOR NON-ACCESSIBILITY ENABLED WEBPAGES

BACKGROUND

Technical Field

The present invention generally relates to implementation of accessibility features and, more particularly, to a distributed system for accessibility tagging and distribution.

Description of the Related Art

Accessibility features, as the term pertains to information technology, refer to features that remove barriers to the access of information technology by certain groups, including those with disabilities, mature users, and non-native language learners. Accessibility principles therefore guide the development of software and hardware to allow access by the greatest number of people.

However, implementing accessibility features can involve a significant amount of development effort to enable the technology under development to comply with accessibility technologies and specifications, and may include the implementation of design patterns, accessible tags and formatting, etc. In the example of making a popular webpage more accessible, the amount of development effort involved can be substantial, particularly in a continuous delivery cycle.

SUMMARY

A method for improving content accessibility includes retrieving an accessibility tag for a piece of content. The piece of content is modified with the accessibility tag to enable one or more accessibility features for the piece of content. The piece of content is then rendered with the accessibility features.

A method for improving content accessibility includes retrieving an accessibility tag for a piece of content from a remote tagging repository in accordance with an identifier for the piece of content. The piece of content is modified by editing a document object model (DOM) of the piece of content in accordance with the accessibility tag to enable one or more accessibility features for the piece of content. The piece of content is then rendered with the accessibility features.

A system for improving content accessibility includes a network interface configured to retrieve an accessibility tag for a piece of content. A content rendering module is configured to modify the piece of content with the accessibility tag to enable one or more accessibility features for the piece of content and to render the piece of content with the accessibility features.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention uses the document object model (DOM) of webpages and other information technology to manipulate the content in question, providing a way to edit or add accessibility tags to existing, non-accessible technology. While the present embodiments will be discussed in the specific context of webpages, it should be understood that the present principles may be extended to any form of technology that may be represented with the DOM.

In this manner, individuals manually insert accessibility tags, modify formats on webpages, and save the tagging information in a distributed fashion to associate accessibility tag information with the edited webpages. When a user then attempts to open a non-accessible webpage or use some other non-accessible software using accessibility tools (e.g., a screen reader), the accessibility tool loads the associated accessibility tags and applies the tags to improve accessibility.

It is to be understood in advance that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
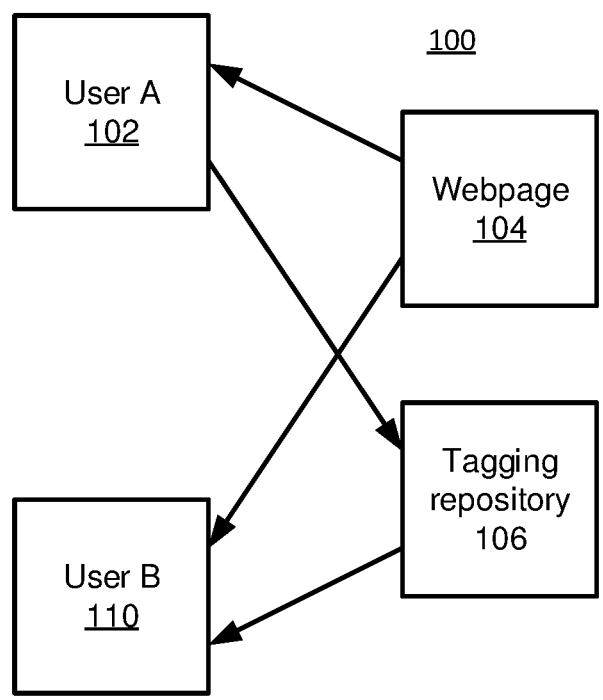
FIG. 1 is a block diagram of a content tagging and delivery system in accordance with the present principles.

Referring now to FIG. 1, a content tagging and delivery system 100 is shown. A first user 102 accesses a webpage 104. The webpage 104 delivers content to the user 102 in the form of one or more hypertext markup language (HTML) files and may additionally provide other varieties of content as well, including images, sound, video, and/or text in one or more formats (e.g., plain text, extensible markup language (XML), etc.).

The first user 102 loads the content of the webpage 104 using a DOM browser/editor. The DOM is a convention for interacting with objects in, e.g., web documents such as HTML and XML. The document is broken up into nodes that are organized in a hierarchical tree structure. The DOM thereby characterizes the state of the webpage and provides an interface for making on-the-fly modifications to the webpage content and how that content is displayed and used. In one specific embodiment it is contemplated that a DOM browser/editor tool used by the first user 102 may include FIREBUG®, but it should be understood that any appropriate DOM browser/editor may be used instead.

In one example, the webpage 104 may have no accessibility features enabled. For example, the webpage 104 may be delivered in plain HTML without and accessibility tags being included. In an alternative example, the webpage 104 may include some accessibility tags, but the tags may be incomplete or incorrect. In either case, the accessibility of the webpage 104 falls short of its potential, making it difficult for some users to access the webpage 104 or some or all of the webpage's features.

The first user 102 therefore manually marks one or more DOM objects on the webpage 104 using the DOM browser/editor tool. These tags may then be incorporated into the webpage as it is rendered at the user 102 to provide additional accessibility features. The first user 102 also saves the tags to a tagging repository 106. The tagging repository is a centralized or decentralized server, implemented locally to the first user 102 or remotely, that stores the tags in a format compatible with the DOM browser/editor tool (e.g., an XML format), such that the tags can be quickly recalled and applied to the webpage 104 the next time it is displayed.

Types of accessibility features that may be added to a webpage or other technology include features that designate how a piece of accessibility software can best render the content to be usable by the most people. In one example, the tags may designate information to automatically read aloud or may provide descriptive text for images or other visual components. In another example, the tags may increase the font size or otherwise magnify certain visual elements. In another example, the tags may provide captioning for audio content. In yet another example, the tags may provide color palette information to avoid or enhance certain colors.

A second user 108 then accesses the webpage 104. The second user 108 wishes to use an accessibility tool, but finds that the webpage 104 itself provides no accessibility tags or, in another example, an incomplete or incorrect set of accessibility tags. The second user 108 then accesses the tagging repository 106 to determine whether there are any stored tags associated with the webpage 104. The second user 108 retrieves these tags from the tagging repository 106 and applies them to the content delivered with the webpage 104 to improve the accessibility of the webpage 104.

In one embodiment, the second user 108 may retrieve the tags from the tagging repository 106 manually or, alternatively, the process may be performed automatically by an accessibility too. For example, a screen reader used by the second user 108 may automatically check the tagging repository 106 whenever any webpage is accessed, even if the webpage has accessibility tags already, to determine whether there is additional or updated tagging information that would improve accessibility.

It is specifically contemplated that the tagging repository 106 may be implemented as a cloud computing service that publicly accessible, allowing many people to contribute accessibility tagging information. Such an embodiment provides a collaborative embodiment, with accessibility tagging information being provided by a large number of individuals. In addition, multiple sets of tagging information can be stored for a particular webpage 104. These multiple sets may include sets of accessibility tags that are tailored for particular types of accessibility software or may, instead, represent different users' interpretations of the most accessible rendering of the webpage 104. As such, the tagging repository may include designations for the tags which, in addition to identifying the webpage the tags apply to, may indicate what accessibility software they are designed for, whether they are incompatible with any other types of accessibility software, and how users have rated the tags for their quality or functionality. These designations may be implemented in a "crowd sourced" fashion, with tag creators identifying them and with users voting as appropriate, or may instead be curated, with one or more administrators reviewing the tags to ensure correctness and compatibility.

In one specific example, the webpage 104 may include the following HTML sample:
<div role="application" data-component="page">
. . .
</div>

The first user 102, upon reviewing the webpage 104, may determine that the webpage would benefit from a label in accordance with the Web Accessibility Initiative—Accessible Rich Internet Applications (WEB_ARIA) specification. Such a label is not made visible to sighted users, but will instead be read out by a screen reader. The modified webpage might instead read:
<div role="application" data-component="page" aria-label="Title of the Page">
. . .
</div>

Figure 2:
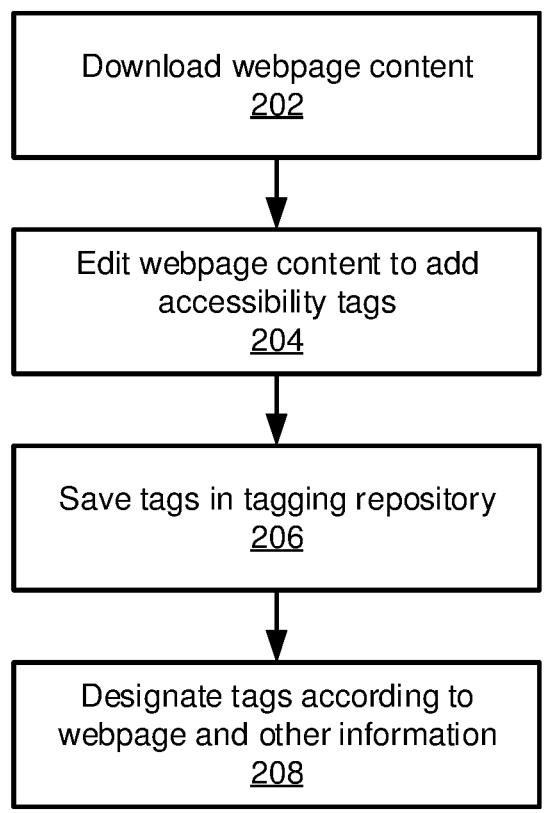
FIG. 2 is a block/flow diagram of a method for tagging content in accordance with the present principles.

Referring now to FIG. 2, a method of providing accessibility tags is shown. Block 202 accesses the webpage content from webpage 104. It should be understood that, although in many cases the webpage content will be accessed from a remote server, it may also be stored locally and retrieved from local memory. This may occur in particular if the content creator is adding tagging information to their own webpage.

Block 204 then edits the webpage content to add accessibility tags. It is specifically contemplated that block 204 may be performed manually by a user with, for example, a DOM browser/editor. Block 206 saves the tags in tagging repository 106. The tags may be saved as a "diff," which specifies edits to make to an existing file, or may be formatted in any other appropriate format to indicate how the webpage content may be altered to add accessibility features. Block 208 designates the tags in accordance with the webpage 104 which they modify. Block 208 may furthermore designate the tags with additional information, for example including compatibility and incompatibility designations for particular kinds of accessibility software.

Figure 3:
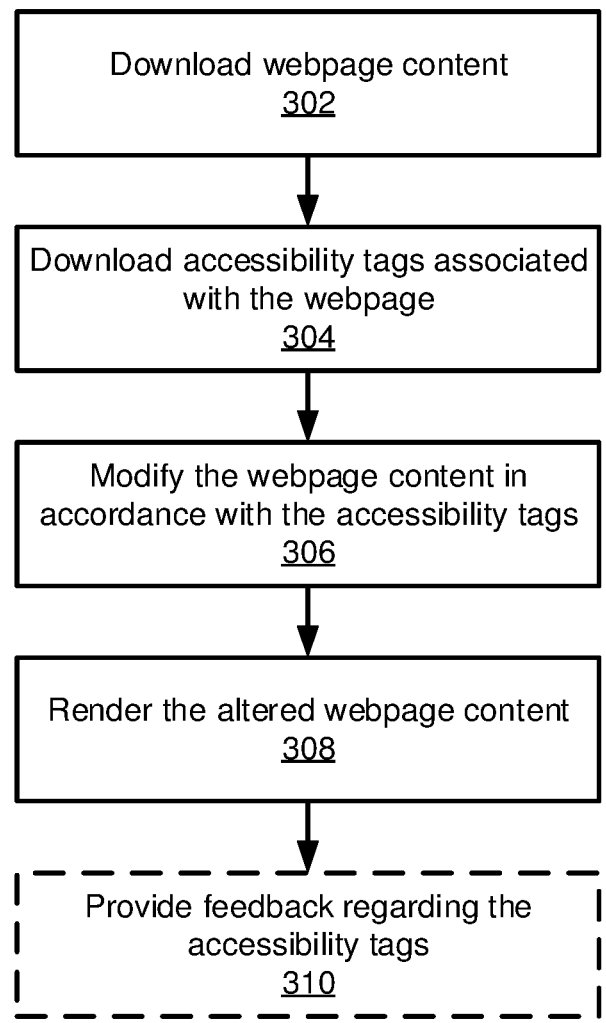
FIG. 3 is a block/flow diagram of a method for modifying content according to stored tags in accordance with the present principles.

Referring now to FIG. 3, a method of retrieving accessibility tags is shown. Block 302 accesses the webpage content. Block 304 then downloads one or more sets of accessibility tags associated with the webpage 104 from the tagging repository 106. Block 304 may be performed manually or automatically, with the second user 108 either explicitly downloading the accessibility tags or with accessibility software automatically fetching the tags when the webpage 104 is accessed. Block 306 modifies the webpage content in accordance with the accessibility tags. Block 306 may be performed manually or automatically, for example through the use of screen reader or other accessibility software that automatically incorporates the accessibility tagging information into the webpage content.

Block 308 renders the altered webpage content. Depending on the type of accessibility tagging, this may include, for example, changing a displayed font size, changing a color scheme, or reading portions of the webpage content aloud. Block 310 optionally provides feedback regarding the accessibility tags to the tagging repository 106, for example indicating areas where the accessibility tags could be improved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
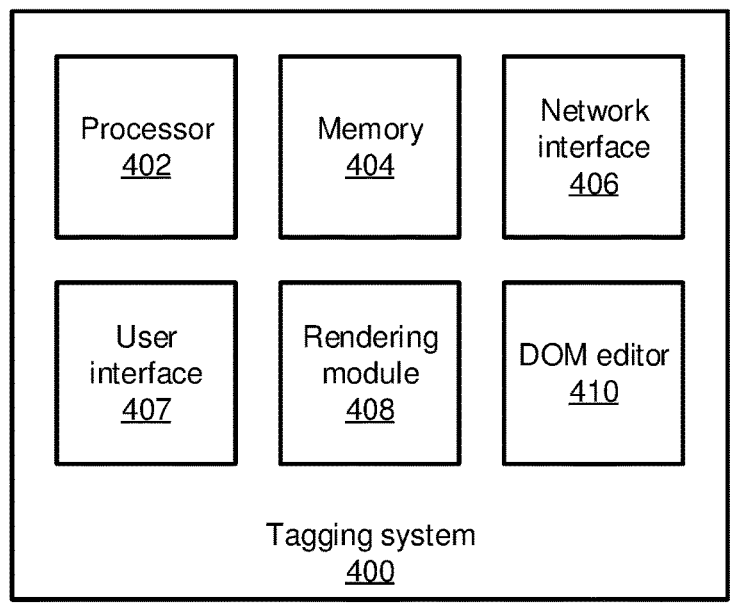
FIG. 4 is a block diagram of a tagging system in accordance with the present principles.

Referring now to FIG. 4, a user system 400 for adding and viewing accessibility tags is shown. The user system 400 is contemplated as performing the role of either the first user 102, which creates and saves accessibility tags, the second user 108, which retrieves and renders content using the accessibility tags, or both. The user system 400 includes a hardware processor 402 and memory 404. The user system 400 further includes a network interface 406 that allows the user system 400 to communicate with other machines (e.g., tagging repository 106) over a network. A user interface 407 includes both hardware and software components that enable a user to interact with content on the system 400.

In addition, the user system 400 includes one or more functional modules. In one embodiment, these functional modules are implemented in software that is stored in memory 404 and is executed by the hardware processor 402. In an alternative embodiment, the functional modules may be implemented as one or more discrete hardware components.

The user system 400 includes a rendering module 408 that uses the network interface to retrieve content from a remote device and renders the content for the user via the user interface 407. This rendering module 408 may include, for example, one or more of a web browser, a screen reader, or any other form of accessibility or content rendering technology. The user system 400 further includes a DOM editor 410 that can modify the content that is rendered by the rendering module 408 using input from the user interface 407. The DOM editor 410 can do this modification on-the-fly, with changes being immediately rendered by the rendering module 408. In addition, the DOM editor 410 can save such changes in the form of accessibility tags to memory 404 or can upload the accessibility tags via the network interface 406 to a tagging repository 106.

In one embodiment, the rendering module 408 retrieves accessibility tags from the tagging repository 106, using the network interface 406, when a new webpage 104 is accessed. In this embodiment, the rendering module 408 is able to automatically incorporate the accessibility tags into the rendering of the webpage 104. In an alternative embodiment, the DOM editor 410 is used to retrieve the accessibility tags and to change the rendered DOM itself.

Figure 5:
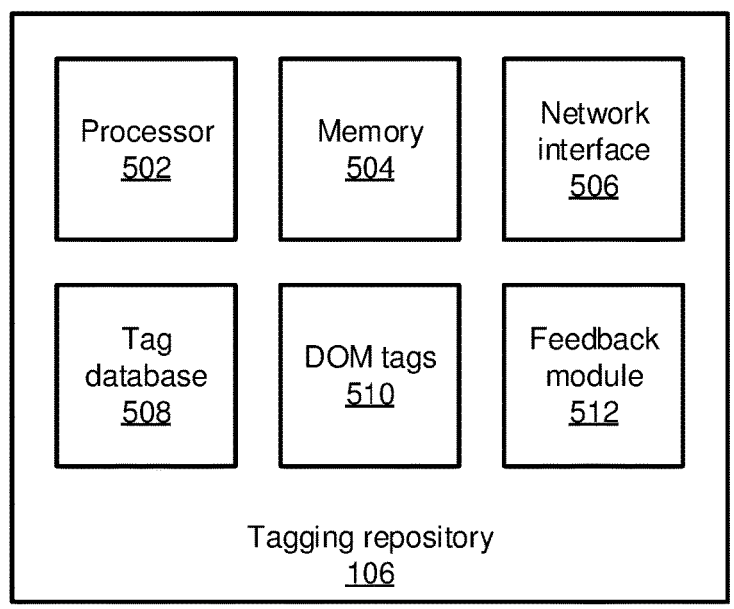
FIG. 5 is a block diagram of a tagging repository in accordance with the present principles.

Referring now to FIG. 5, a tagging repository 106 is shown. The tagging repository 106 includes a hardware processor 502 and memory 504. The tagging repository 106 further includes a network interface 506 that allows the tagging repository 106 to communicate with other machines (e.g., user system 400) over a network. In addition, the tagging repository 106 includes one or more functional modules. In one embodiment, these functional modules are implemented in software that is stored in memory 504 and is executed by the hardware processor 502. In an alternative embodiment, the functional modules may be implemented as one or more discrete hardware components.

The tagging repository 106 further includes a tag database 508 storing DOM tags 510. The DOM tags 510 in general are supplied by individual user systems 400, but may also be created and stored locally at the tagging repository 106. The When the tagging repository 106 retrieves a request for accessibility tags for a particular webpage 104 via the network interface 506, the tag database 508 is searched to locate one or more sets of DOM tags 510 associated with the webpage 104, with the search being guided by a webpage identifier and any additional information that may be included with the request, such as accessibility software compatibility. The located DOM tags 510 are then transmitted back to the requesting second user 108. A feedback module 512 optionally accepts feedback from users regarding the DOM tags 510 to supply ratings and other information regarding the DOM tags 510 that may be useful to the requesting user(s).

Figure 6:
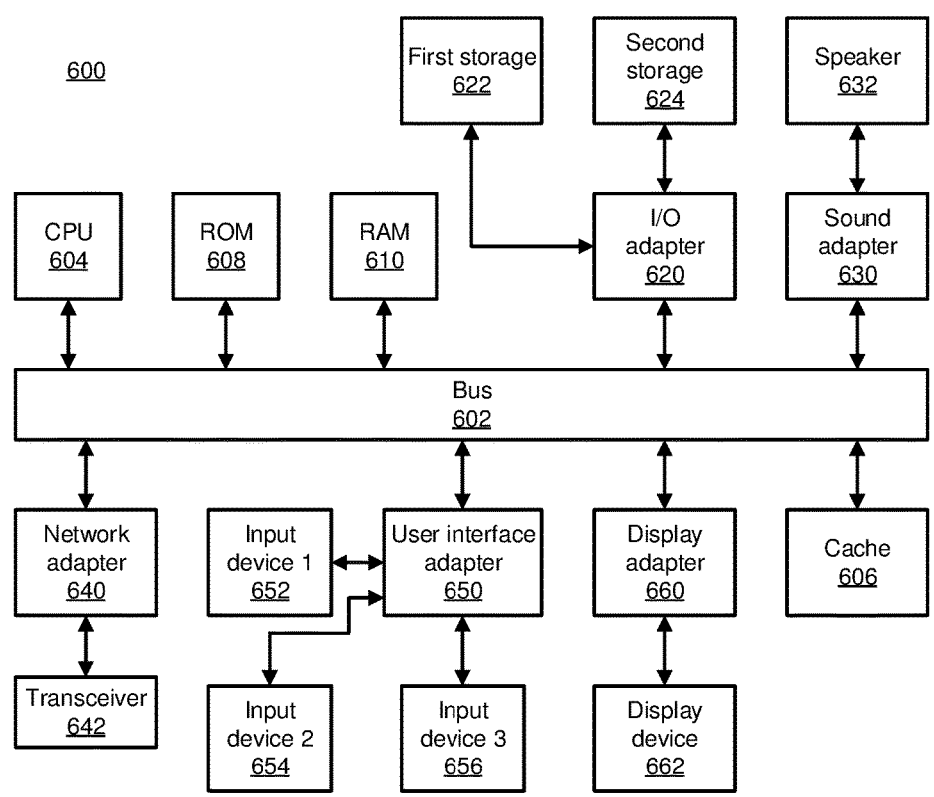
FIG. 6 is a block diagram of a processing system in accordance with the present principles.

Referring now to FIG. 6, an exemplary processing system 600 is shown which may represent the user system 400 or the tagging repository 106. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Figure 7:
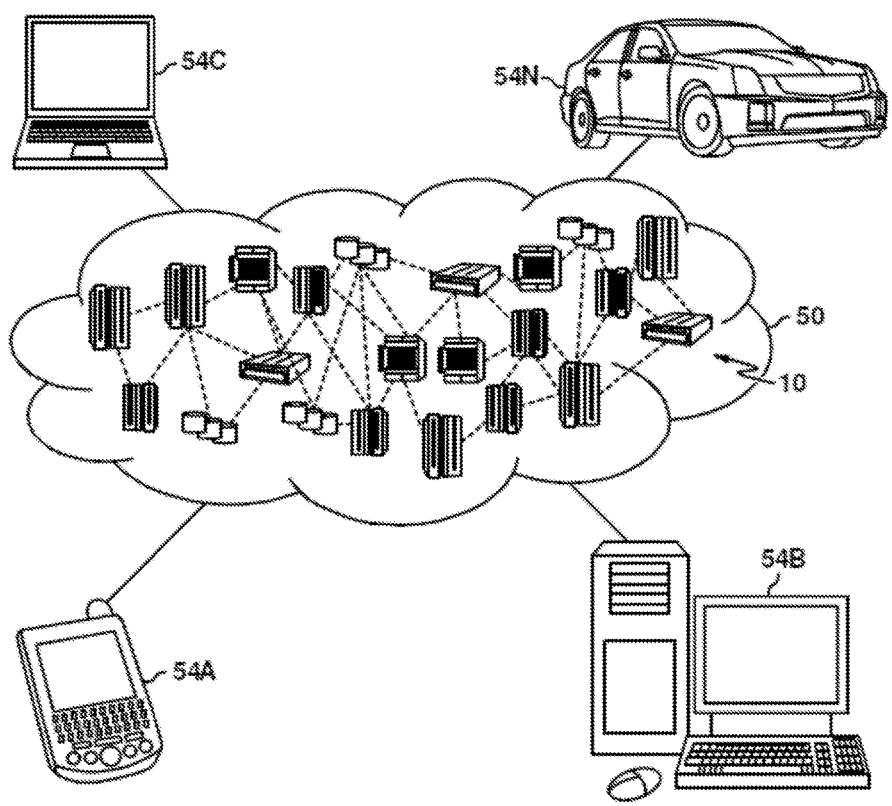
FIG. 7 is a diagram of a cloud computing environment according to the present principles.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
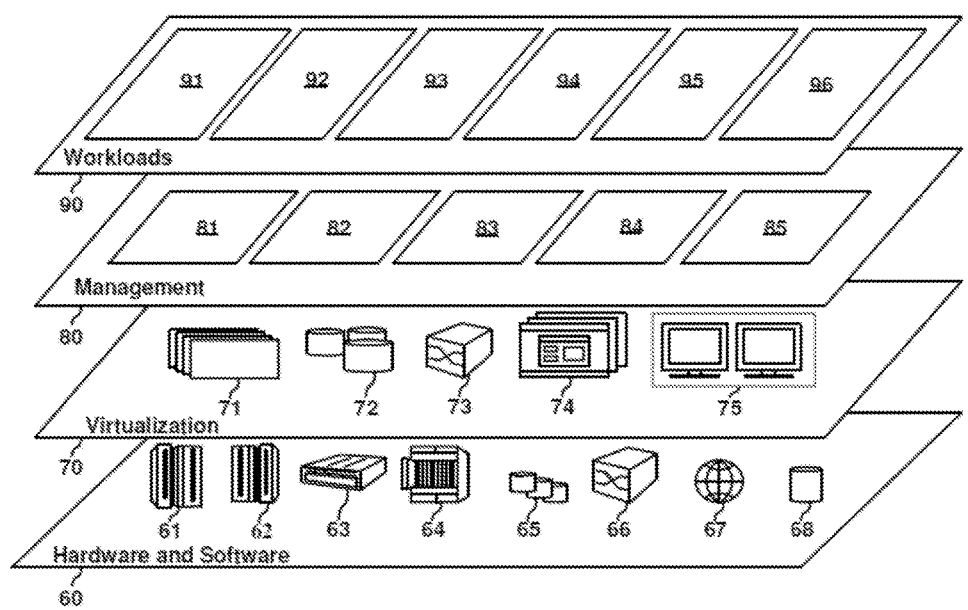
FIG. 8 is a diagram of abstraction model layers according to the present principles.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and accessibility tag management 96.

Having described preferred embodiments of an accessibility tagger for non-accessibility enabled webpages (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for improving content accessibility, comprising:
    retrieving an accessibility tag for a piece of content;
    modifying the piece of content with the accessibility tag to enable one or more accessibility features for the piece of content that remove barriers for the access of information technology by groups of users; and
    rendering the piece of content with the accessibility features in a manner that is accessible to the groups of users.

2. The method of claim 1, wherein modifying the piece of content comprises modifying a document object model (DOM) of the content in accordance with the accessibility tag.

3. The method of claim 1, wherein the piece of content has no initial accessibility tags.

4. The method of claim 1, wherein the piece of content has incorrect initial accessibility tags.

5. The method of claim 1, wherein the accessibility tag is retrieved from a remote tagging repository.

6. The method of claim 5, wherein retrieving the accessibility tag comprises requesting an accessibility tag from the tagging repository in accordance with an identifier for the piece of content.

7. The method of claim 1, further comprising modifying the piece of content to introduce one or more new accessibility tags other than the retrieved accessibility tag.

8. The method of claim 7, further comprising saving the one or more new accessibility tags to a remote tagging repository.

9. A non-transitory computer readable storage medium comprising a computer readable program for improving content accessibility, wherein the computer readable program when executed on a computer causes the computer to perform the steps of claim 1.

10. A method for improving content accessibility, comprising:
    retrieving an accessibility tag for a piece of content from a remote tagging repository in accordance with an identifier for the piece of content;
    modifying the piece of content by editing a document object model (DOM) of the piece of content in accordance with the accessibility tag to enable one or more accessibility features for the piece of content that remove barriers for the access of information technology by groups of users; and
    rendering the piece of content with the accessibility features in a manner that is accessible to the groups of users.

11. The method of claim 10, wherein the piece of content has no initial accessibility tags.

12. The method of claim 10, wherein the piece of content has incorrect initial accessibility tags.

13. The method of claim 10, further comprising modifying the piece of content to introduce one or more new accessibility tags other than the retrieved accessibility tag.

14. The method of claim 13, further comprising saving the one or more new accessibility tags to a remote tagging repository.

15. A system for improving content accessibility, comprising:
   a network interface configured to retrieve an accessibility tag for a piece of content; and
   a content rendering module configured to modify the piece of content with the accessibility tag to enable one or more accessibility features for the piece of content that remove barriers for the access of information technology by groups of users and to render the piece of content with the accessibility features in a manner that is accessible to the groups of users.

16. The system of claim 15, wherein the content rendering module is further configured to modify a document object model (DOM) of the content in accordance with the accessibility tag.

17. The system of claim 15, wherein the piece of content has no initial accessibility tags.

18. The system of claim 15, wherein the piece of content has incorrect initial accessibility tags.

19. The system of claim 15, wherein the accessibility tag is retrieved from a remote tagging repository.

20. The system of claim 19, wherein the network interface is further configured to request an accessibility tag from the tagging repository in accordance with an identifier for the piece of content.

* * * * *